(12) United States Patent
Long (10) Patent No.: US 12,207,221 B2
(45) Date of Patent: Jan. 21, 2025

(54) METHODS AND NODES FOR NOTIFICATION SUBSCRIPTION

(71) Applicant: Telefonaktiebolaget LM Ericsson (publ), Stockholm (SE)

(72) Inventor: Hongxia Long, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 383 days.

(21) Appl. No.: 17/044,576

(22) PCT Filed: Apr. 4, 2019

(86) PCT No.: PCT/CN2019/081468
§ 371 (c)(1),
(2) Date: Oct. 1, 2020

(87) PCT Pub. No.: WO2019/192593
PCT Pub. Date: Oct. 10, 2019

(65) Prior Publication Data
US 2021/0112514 A1 Apr. 15, 2021

(30) Foreign Application Priority Data
Apr. 5, 2018 (WO) .............. PCT/CN2018/082068

(51) Int. Cl.
*H04W 60/04* (2009.01)
*H04L 101/385* (2022.01)
(Continued)

(52) U.S. Cl.
CPC ............. *H04W 60/04* (2013.01); *H04W 8/08* (2013.01); *H04W 8/20* (2013.01); *H04L 2101/385* (2022.05)

(58) Field of Classification Search
CPC ..... Y02E 30/00; Y02E 30/30; H04L 61/3085; H04W 60/04; H04W 8/08; H04W 8/18; H04W 8/20
(Continued)

(56) References Cited

U.S. PATENT DOCUMENTS

2017/0332421 A1    11/2017   Sternberg et al.
2018/0007612 A1*    1/2018   Jahangir ............... H04L 61/503
(Continued)

OTHER PUBLICATIONS

3GPP TS 29.503 V0.5.0 Mar. 2018.*
Internet society requests for comment, SIP-Specific Event Notification, Feb. 12, 2019, IP.com, (Year: 2019).*
3GPP, "3GPP TS 29.501 V1.0.0", 3rd Generation Partnership Project; Technical Specification Group Core Network and Terminals; 5G System; Principles and Guidelines for Services Definition; (Release 15), Mar. 2018, 1-47.
(Continued)

*Primary Examiner* — Charles N Appiah
*Assistant Examiner* — Nicole M Louis-Fils
(74) *Attorney, Agent, or Firm* — Murphy, Bilak & Homiller, PLLC (57) ABSTRACT

The present disclosure provides a method (500) in a Network Function (NF) node for subscription to notification of data change in a Unified Data Management (UDM) node. The method (500) includes: transmitting (510) to the UDM node a request for retrieval of a user subscription data or a request for registration with the UDM node, the request for retrieval or the request for registration including a callback Uniform Resource Identifier (URI) for use by the UDM node to notify the NF node of the data change; and receiving (520) from the UDM node a response to the request for retrieval or the request for registration.

20 Claims, 7 Drawing Sheets

(51) Int. Cl.
*H04W 8/08* (2009.01)
*H04W 8/20* (2009.01)

(58) Field of Classification Search
USPC .......................................................... 370/329
See application file for complete search history.

(56) References Cited

U.S. PATENT DOCUMENTS

| | | | |
|---|---|---|---|
| 2018/0270778 A1* | 9/2018 | Bharatia | H04L 65/1073 |
| 2019/0037516 A1* | 1/2019 | Kim | H04W 60/005 |
| 2019/0124572 A1* | 4/2019 | Park | H04W 80/10 |
| 2019/0166016 A1* | 5/2019 | Livanos | H04L 67/61 |
| 2019/0182875 A1* | 6/2019 | Talebi Fard | H04W 76/11 |
| 2019/0238425 A1* | 8/2019 | Mladin | H04L 41/5048 |
| 2019/0349744 A1* | 11/2019 | Zong | H04W 8/065 |
| 2020/0068340 A1* | 2/2020 | Rasanen | H04W 60/04 |
| 2020/0267201 A1* | 8/2020 | Rauschenbach | G06F 9/542 |
| 2021/0112514 A1* | 4/2021 | Long | H04W 8/08 |
| 2021/0258769 A1* | 8/2021 | Kim | H04W 8/18 |

OTHER PUBLICATIONS

3GPP, "3rd Generation Partnership Project; Technical Specification Group Core Network and Terminals; 5G System; Unified Data Management Services Stage 3 (Release 15)", 3GPP TS 29.503 V0.5.0, Mar. 2018, 1-82.

3GPP, "3rd Generation Partnership Project; Technical Specification Group Services and System Aspects; Procedures for the 5G System; Stage 2 (Release 15)", 3GPP TS 23.502 V15.0.0, Dec. 2017, 1-258.

3GPP, "3rd Generation Partnership Project; Technical Specification Group Services and System Aspects; System Architecture for the 5G System; Stage 2 (Release 15)", 3GPP TS 23.501 V15.0.0, Dec. 2017, 1-181.

Nokia, et al., "Pseudo-CR on Nudm_SDM Access and Mobility Subscription Data", 3GPP TSG CT4 Meeting #82, C4-181277, Gothenburg, Sweden, Jan. 22-26, 2018, 1-6.

ZTE, "Pseudo-CR on SMSF Related Procedures", 3GPP TSG CT4 Meeting #82, C4-181073, Gothenburg, Sweden, Jan. 22-26, 2018, 1-7.

* cited by examiner

METHODS AND NODES FOR NOTIFICATION SUBSCRIPTION

TECHNICAL FIELD

The present disclosure relates to communication technology, and more particularly, to methods and nodes for notification subscription.

BACKGROUND

Figure 1:
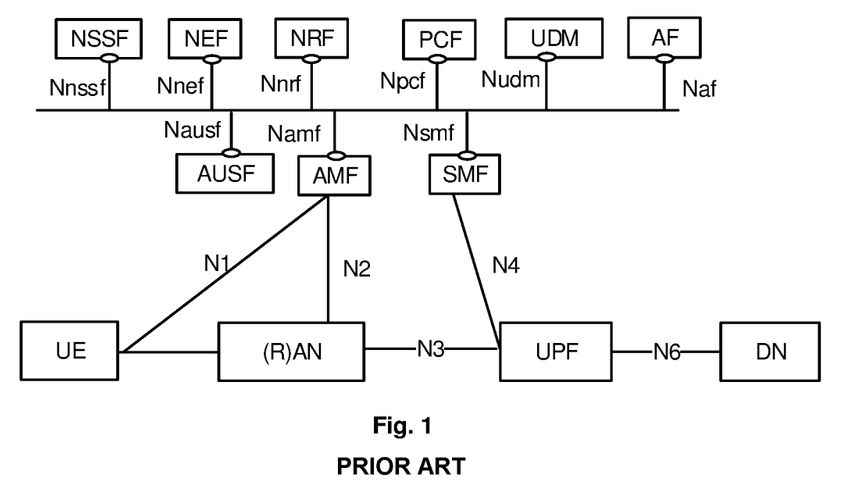
FIG. 1 is a schematic diagram showing a service-based representation of the 5G architecture.
Figure 2:
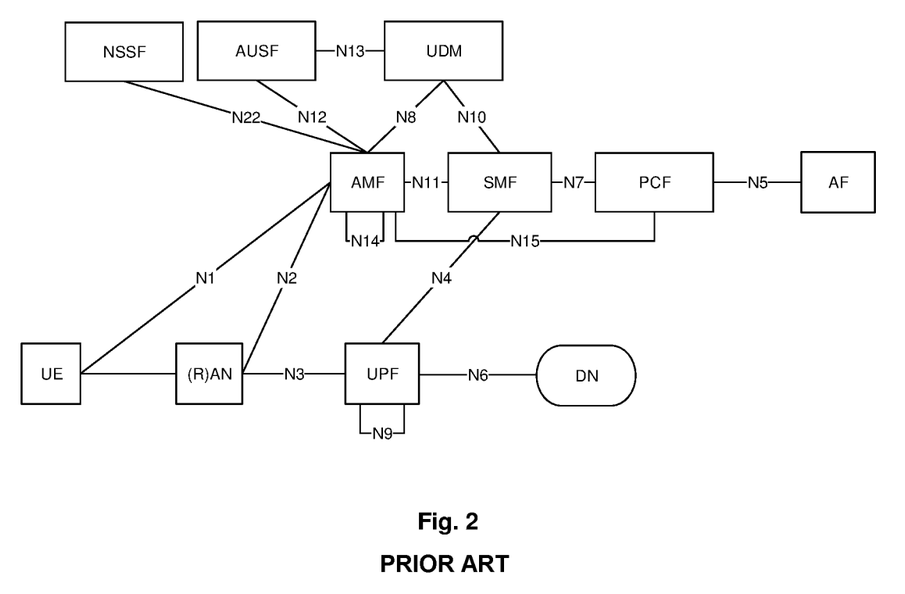
FIG. 2 is a schematic diagram showing a reference point representation of the 5G architecture.

The 5$^{th}$ Generation (5G) architecture is defined to be service-based and interactions between Network Functions (NFs) can be represented in a service-based representation or a reference point representation. FIG. 1 shows the service-based representation of the 5G architecture. As shown, NFs in a control plane enable other authorized NFs to access their services. FIG. 2 shows the reference point representation of the 5G architecture. In FIG. 2, interactions between NF services are described by point-to-point reference point between any two NFs. The NFs within the 5G control plane shall only use service-based interfaces for their interactions.

The 5G system architecture includes the following NFs:
Authentication Server Function (AUSF),
Access and Mobility Management Function (AMF),
Data Network (DN), e.g. operator services, Internet access or 3rd party services,
Unstructured Data Storage Function (UDSF),
Network Exposure Function (NEF),
NF Repository Function (NRF),
Network Slice Selection Function (NSSF),
Policy Control Function (PCF),
Session Management Function (SMF),
Short Message Service Function (SMSF),
Unified Data Management (UDM),
Unified Data Repository (UDR),
User Plane Function (UPF),
Application Function (AF),
User Equipment (UE),
(Radio) Access Network ((R)AN),
5G-Equipment Identity Register (5G-EIR), and
Security Edge Protection Proxy (SEPP).

The 5G system architecture includes the following service-based interfaces:
Namf: Service-based interface exhibited by AMF,
Nsmf: Service-based interface exhibited by SMF,
Nnef: Service-based interface exhibited by NEF,
Npcf: Service-based interface exhibited by PCF,
Nudm: Service-based interface exhibited by UDM,
Naf: Service-based interface exhibited by AF,
Nnrf: Service-based interface exhibited by NRF,
Nnssf: Service-based interface exhibited by NSSF,
Nausf: Service-based interface exhibited by AUSF,
Nudr: Service-based interface exhibited by UDR,
Nudsf: Service-based interface exhibited by UDSF, and
N5g-eir: Service-based interface exhibited by 5G-EIR.

For details of the above NFs and interfaces, reference can be made to the 3$^{rd}$ Generation Partnership Project (3GPP) TS 23.501 V15.0.0 (2017-12), which is incorporated herein by reference in its entirety.

Among the above NFs, Unified Data Management (UDM) includes support for the following functionalities:
Generation of 3GPP Authentication and Key Agreement (AKA) Authentication Credentials,
User Identification Handling (e.g. storage and management of Subscriber Permanent Identifier (SUPI) for each subscriber in the 5G system),
Access authorization based on subscription data (e.g. roaming restrictions),
User Equipment (UE)'s Serving NF Registration Management (e.g. storing serving AMF for UE, storing serving SMF for UE's Protocol Data Unit (PDU) Session),
Support to service/session continuity e.g. by keeping SMF/DNN assignment of ongoing sessions,
Mobile Terminated (MT) Short Message Service (SMS) delivery support,
Lawful Intercept (LI) Functionality (especially in outbound roaming case where UDM is the only point of contact for LI),
Subscription management, and
SMS management.

To provide the above functionalities, the UDM uses subscription data (including authentication data) that may be stored in the UDR. In this case, the UDM implements application logic and does not require any internal user data storage and several different UDMs may serve one single user in different transactions.

For details of UDM services, reference can be made to 3GPP TS 23.502 V15.0.0 (2017 December), which is incorporated herein by reference in its entirety.

Conventionally, if an NF service consumer (e.g., AMF, SMF or SMSF) wants to be notified of any change in user subscription data in the UDM, it has to send an explicit request to the UDM for subscription to notification of such data change.

Figure 3:
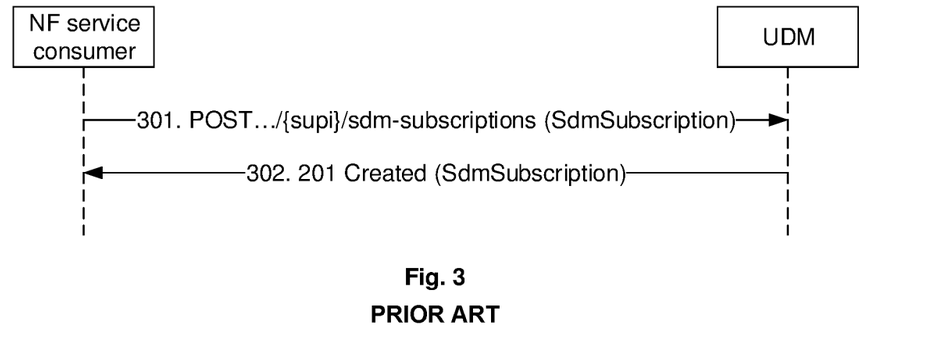
FIG. 3 is a sequence diagram showing an explicit notification subscription procedure.

FIG. 3 shows a signaling sequence for such explicit subscription. As shown, at 301, the NF service consumer sends a POST request to the UDM to create a subscription as present in the request body. The request contains a Uniform Resource Identifier (URI) of its monitored resource and a callback URI to be used by the UDM for notifying the NF service consumer of the data change, both included in the request body "SdmSubscription". At 302, the UDM responds with "201 Created" with a message body containing a representation of the created subscription. The Location Hyper Text Transfer Protocol (HTTP) header contains the URI of the created subscription.

Figure 4:
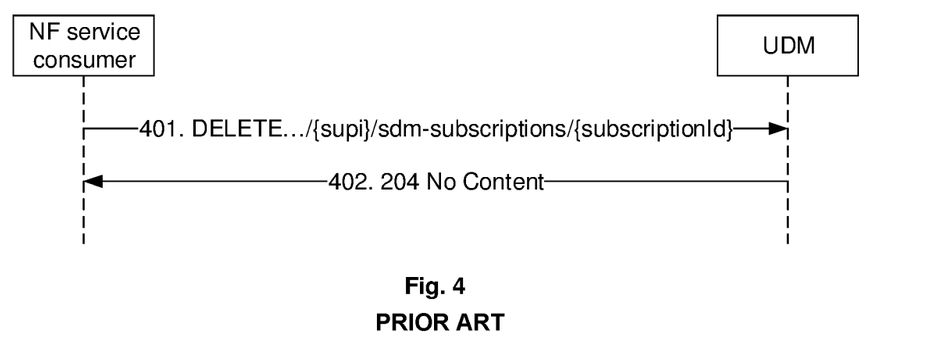
FIG. 4 is a sequence diagram showing a notification unsubscription procedure.

FIG. 4 shows a signaling sequence for unsubscription from notification of the data change. As shown, at 401, the NF service consumer sends a DELETE request to the resource identified by the URI previously received during the subscription creation (i.e., the URI previously received in the Location HTTP header of the response to the subscription). At 402, the UDM responds with "204 No Content".

For further details of the above subscription and unsubscription procedures, reference can be made to 3GPP TS 29.503 V0.5.0 (2018-03), which is incorporated herein by reference in its entirety.

In some cases where a service execution is based on a user subscription data, when the user subscription data is changed (e.g., when a feature is changed from enabled to disabled, or when an Operator Defined Barring (ODB) policy for a feature is updated), such change needs be notified to the NF service consumer to trigger some business logic update. However, in the service-based architecture in the 5G system, the service-based interfaces are Representational State Transfer (REST) based, which means that the UDM, as a server, is unaware of the callback URI for use in the notification if such notification has not been explicitly subscribed by the NF service consumer, as a client. Hence, when there is a change in the user subscription data in the UDM that needs to be notified to the NF service consumer, it would be impossible if e.g., the explicit subscription has not been initiated yet or has been initiated but failed for certain errors, such as temporary network congestions and outages.

There is thus a need for an improved solution for notification subscription.

SUMMARY

It is an object of the present disclosure to provide methods and nodes for notification subscription.

According to a first aspect of the present disclosure, a method in a Network Function (NF) node for subscription to notification of data change in a Unified Data Management (UDM) node is provided. The method includes: transmitting to the UDM node a request for retrieval of a user subscription data or a request for registration with the UDM node, the request for retrieval or the request for registration including a callback Uniform Resource Identifier (URI) for use by the UDM node to notify the NF node of the data change; and receiving from the UDM node a response to the request for retrieval or the request for registration.

In an embodiment, the request for retrieval may include a query parameter, as a request for subscription to notification of the data change associated with the user subscription data, and the callback URI may be indicated in a key value of the query parameter.

In an embodiment, the request for retrieval may be based on a Hyper Text Transfer Protocol (HTTP) GET or POST method.

In an embodiment, the request for registration may include a request body, as a request for subscription to notification of the data change relevant to the NF node, and the callback URI may be carried in the request body.

In an embodiment, the request for registration may be based on an HTTP PUT method.

In an embodiment, the response may include a subscription URI for a subscription created at the UDM.

In an embodiment, the method may further include: transmitting to the UDM node a request for unsubscription from the notification using the subscription URI.

In an embodiment, the NF node may be an Access and Mobility Management Function (AMF) node and the data change may include a change in access and mobility subscription data, Session Management Function (SMF) selection subscription data, or Short Message Service (SMS) subscription data.

Alternatively, the NF node may be an SMF node and the data change may include a change in session management subscription data. Alternatively, the NF node may be an SMS Function (SMSF) node and the data change includes a change in SMS management subscription data.

According to a second aspect of the present disclosure, a NF node is provided. The NF node includes a transceiver, a processor and a memory. The memory includes instructions executable by the processor whereby the NF node is operative to perform the method according to the above first aspect.

According to a third aspect of the present disclosure, a computer readable storage medium is provided. The computer readable storage medium has computer program instructions stored thereon. The computer program instructions, when executed by a processor in an NF node, cause the NF node to perform the method according to the above first aspect.

According to a fourth aspect of the present disclosure, a method in a UDM node for managing subscription of an NF node to notification of data change in the UDM node is provided. The method includes: receiving from the NF node a request for retrieval of a user subscription data or a request for registration with the UDM node, the request for retrieval or the request for registration including a callback URI for use by the UDM node to notify the NF node of the data change; and creating a subscription to notification of the data change based on the callback URI.

In an embodiment, the request for retrieval may include a query parameter, as a request for subscription to notification of the data change associated with the user subscription data, and the callback URI may be indicated in a key value of the query parameter.

In an embodiment, the request for retrieval may be based on an HTTP GET or POST method.

In an embodiment, the request for registration may include a request body, as a request for subscription to notification of the data change relevant to the NF node, and the callback URI is carried in the request body.

In an embodiment, the request for registration may be based on an HTTP PUT method.

In an embodiment, the method may further include: transmitting to the NF node a response to the request for retrieval or the request for registration. The response includes a subscription URI for the created subscription.

In an embodiment, the method may further include: receiving from the NF node a request for unsubscription from the notification using the subscription URI; and removing the subscription in response to the request for unsubscription.

In an embodiment, the NF node may be an AMF node and the data change may include a change in access and mobility subscription data, SMF selection subscription data, or SMS subscription data. Alternatively, the NF node may be an SMF node and the data change may include a change in session management subscription data. Alternatively, the NF node may be a SMSF node and the data change may include a change in SMS management subscription data.

According to a fifth aspect of the present disclosure, a UDM node is provided. The UDM node includes a transceiver, a processor and a memory. The memory includes instructions executable by the processor whereby the UDM node is operative to perform the method according to the above fourth aspect.

According to a sixth aspect of the present disclosure, a computer readable storage medium is provided. The computer readable storage medium has computer program instructions stored thereon. The computer program instructions, when executed by a processor in a UDM node, cause the UDM node to perform the method according to the above fourth aspect.

With the embodiments of the present disclosure, an NF node can subscribe to notification of data change in the UDM node at the time of data retrieval from the UDM node or registration with the UDM node. A callback URI can be included in a request for retrieval or registration, for use by the UDM node to notify the NF node of the data change. Thus, the explicit subscription as shown in FIG. 3 can be avoided and the request for retrieval or registration can double as a request for subscription. In this sense the subscription in the present disclosure is "implicit". With the introduction of such implicit subscription, the signaling overhead associated with the subscription can be reduced, and the subscription can be performed in a more flexible way such that the NF node can be notified of any data change in the UDM node timely.

BRIEF DESCRIPTION OF THE DRAWINGS

The above and other objects, features and advantages will be more apparent from the following description of embodiments with reference to the figures, in which.

DETAILED DESCRIPTION

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and or combinations thereof.

In the following description and claims, unless defined otherwise, all technical and scientific terms used herein have the same meaning as commonly understood by one of ordinary skills in the art to which this disclosure belongs.

Figure 5:
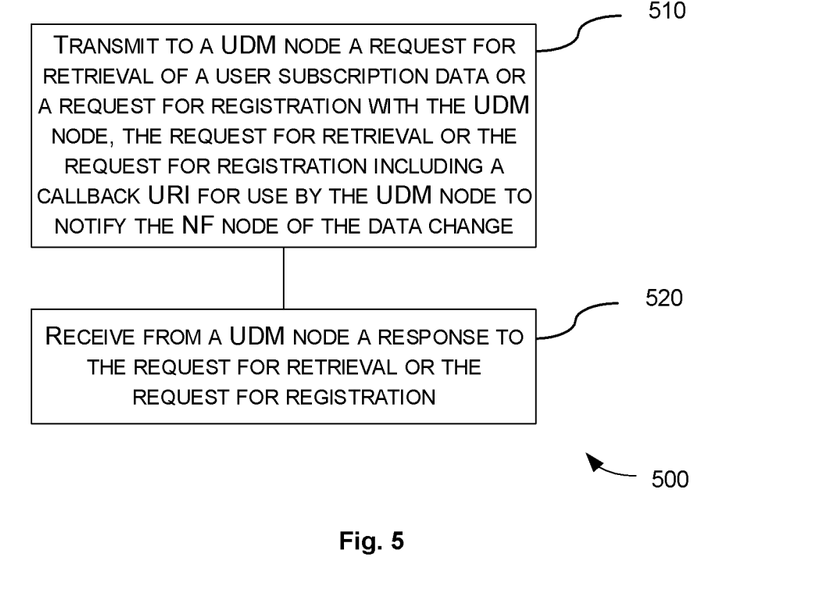
FIG. 5 is a flowchart illustrating a method in an NF node for subscription to notification of data change in a UDM node according to an embodiment of the present disclosure.

FIG. 5 is a flowchart illustrating a method 500 for subscription to notification of data change in a UDM node according to an embodiment of the present disclosure. The method 500 can be performed at an NF node, e.g., an AMF node, an SMF node or an SMSF node.

At block 510, a request for retrieval of a user subscription data or a request for registration with the UDM node is transmitted to the UDM node. The request for retrieval or the request for registration includes a callback URI for use by the UDM node to notify the NF node of the data change.

Here, the request for retrieval can include a query parameter, as a request for subscription to notification of the data change associated with the user subscription data. The callback URI can be indicated in a key value of the query parameter. The request for retrieval can be based on an HTTP GET or POST method.

The request for registration can include a request body, as a request for subscription to notification of the data change relevant to the NF node. The callback URI can be carried in the request body. The request for registration can be based on an HTTP PUT method.

As an example, the NF node can be an AMF node and the data change can include a change in access and mobility subscription data, SMF selection subscription data, or SMS subscription data. Alternatively, the NF node can be an SMF node and the data change can include a change in session management subscription data. Alternatively, the NF node can be a SMSF node and the data change can include a change in SMS management subscription data.

At block 520, a response to the request for retrieval or the request for registration is received from the UDM node.

In an example, the response can include a subscription URI for a subscription created at the UDM. The NF node can transmit to the UDM node a request for unsubscription from the notification using the subscription URI.

Figure 6:
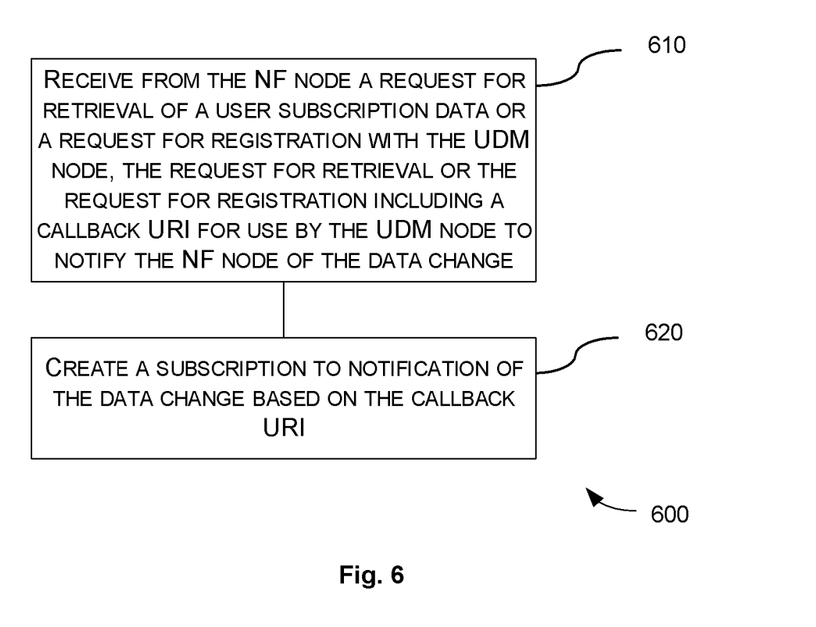
FIG. 6 is a flowchart illustrating a method in a UDM node for managing subscription of an NF node to notification of data change in the UDM node according to an embodiment of the present disclosure.

FIG. 6 is a flowchart illustrating a method 600 for managing subscription of an NF node to notification of data change in the UDM node according to an embodiment of the present disclosure. The method 600 can be performed at a UDM node.

At block 610, a request for retrieval of a user subscription data or a request for registration with the UDM node is received from the NF node. The request for retrieval or the request for registration includes a callback URI for use by the UDM node to notify the NF node of the data change.

Here, the request for retrieval can include a query parameter, as a request for subscription to notification of the data change associated with the user subscription data. The callback URI can be indicated in a key value of the query parameter. The request for retrieval can be based on an HTTP GET or POST method.

The request for registration can include a request body, as a request for subscription to notification of the data change relevant to the NF node. The callback URI can be carried in the request body. The request for registration can be based on an HTTP PUT method.

As an example, the NF node can be an AMF node and the data change can include a change in access and mobility subscription data, SMF selection subscription data, or SMS subscription data. Alternatively, the NF node can be an SMF node and the data change can include a change in session management subscription data. Alternatively, the NF node can be a SMSF node and the data change can include a change in SMS management subscription data.

At block 620, a subscription to notification of the data change is created based on the callback URI.

In an example, the UDM node can transmit to the NF node a response to the request for retrieval or the request for registration. The response can include a subscription URI for the created subscription.

In an example, the UDM node can receive from the NF node a request for unsubscription from the notification using the subscription URI. Then, the UDM node can remove the subscription in response to the request for unsubscription.

In the following, the above methods 500 and 600 will be explained in further detail with reference to FIGS. 7A-7D and 8A-8C.

FIGS. 7A-7D are sequence diagrams each showing a notification subscription procedure using a request for retrieval according to an embodiment of the present disclosure.

Figure 7A:
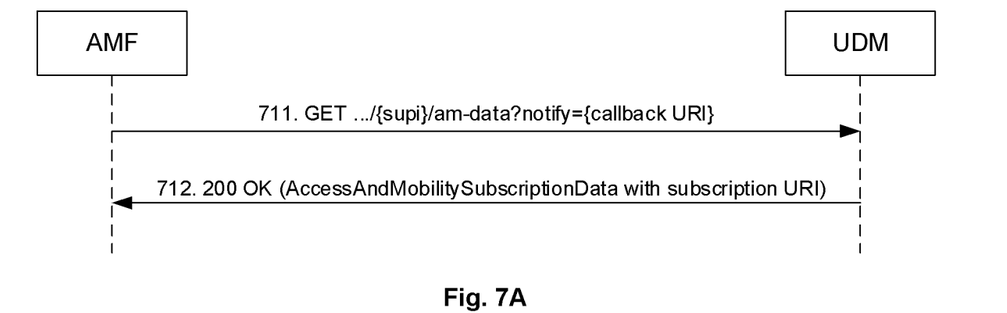
FIGS. 7A-7D are sequence diagrams each showing a notification subscription procedure according to an embodiment of the present disclosure.

In particular, as shown in FIG. 7A, at 711, an AMF node sends to the UDM node an HTTP GET request for retrieval of a UE's access and mobility subscription data from the UDM node. The GET request can have a URI, or Uniform Resource Locator (URL), such as:
http://{apiRoot}/nudm-sdm/v1/{supi}/am-data?notify={callbackURI}.

Here, a query parameter "notify={callbackURI}" is included in the request and its presence indicates that the AMF node is requesting for subscription to notification of changes in the access and mobility subscription data. The key value of the parameter indicates a callback URI for use by the UDM node to notify such changes.

At 712, the UDM node responds with "200 OK", having a message body containing the requested access and mobility subscription data along with a subscription URI for the subscription created at the UDM node. Then, the AMF node can save the subscription URI, which can be used later for explicit unsubscription from the notification as described above in connection with FIG. 4.

On the other hand, an HTTP GET request without the query parameter means that no request for subscription is made. For the subscription created at the UDM in response to the GET request at 711, a later HTTP GET request for retrieval of the UE's access and mobility subscription data without the query parameter may indicate to the UDM node that the AMF node now intends to unsubscribe from the notification and the UDM node can remove the created subscription in response to the absence of the query parameter. However, such absence of the query parameter may not result in removal of a subscription created in response to the explicit subscription request as shown in FIG. 3, as the latter has a higher priority.

Figure 7B:
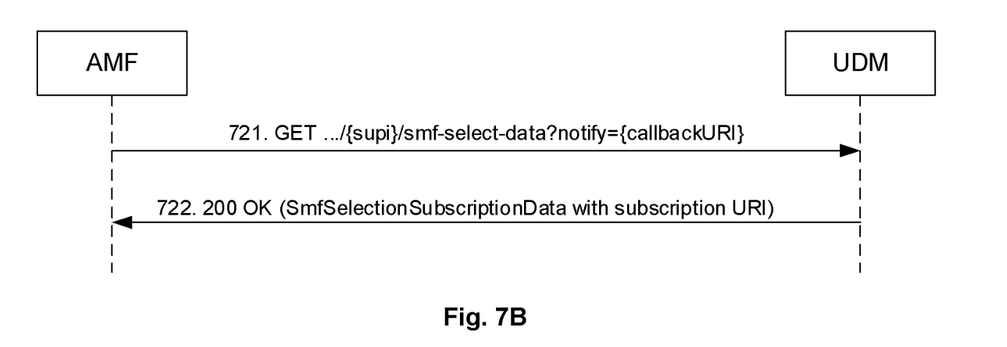

As shown in FIG. 7B, at 721, an AMF node sends to the UDM node an HTTP GET request for retrieval of a UE's SMF selection subscription data from the UDM node. The GET request can have a URI or URL such as:
http://{apiRoot}/nudm-sdm/v1/{supi}/smf-select-data?notify={callbackURI}.

Here, a query parameter "notify={callbackURI}" is included in the request and its presence indicates that the AMF node is requesting for subscription to notification of changes in the SMF selection subscription data. The key value of the parameter indicates a callback URI for use by the UDM node to notify such changes.

At 722, the UDM node responds with "200 OK", having a message body containing the requested SMF selection subscription data along with a subscription URI for the subscription created at the UDM node. Then, the AMF node can save the subscription URI, which can be used later for explicit unsubscription from the notification as described above in connection with FIG. 4.

As described above, a later HTTP GET request for retrieval of the SMF selection subscription data without the query parameter may result in removal of the subscription created at the UDM node in response to the GET request at 721, but not a subscription created in response to the explicit subscription request as shown in FIG. 3.

The above sequences described in FIGS. 7A and 7B also apply when the AMF node subscribes to notification of changes in SMS subscription data and further details thereof will be omitted here.

Figure 7C:
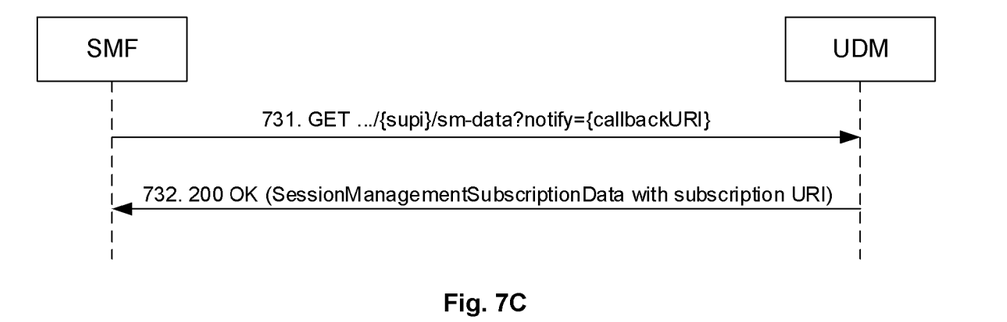

As shown in FIG. 7C, at 731, an SMF node sends to the UDM node an HTTP GET request for retrieval of an UE's session management subscription data from the UDM node. The GET request can have a URI or URL such as:
http://{apiRoot}/nudm-sdm/v1/{supi}/sm-data?notify={callbackURI}.

Here, a query parameter "notify={callbackURI}" is included in the request and its presence indicates that the SMF node is requesting for subscription to notification of changes in the session management subscription data. The key value of the parameter indicates a callback URI for use by the UDM node to notify such changes.

At 732, the UDM node responds with "200 OK", having a message body containing the requested session management subscription data along with a subscription URI for the subscription created at the UDM node. Then, the SMF node can save the subscription URI, which can be used later for explicit unsubscription from the notification as described above in connection with FIG. 4.

As described above, a later HTTP GET request for retrieval of the session management subscription data without the query parameter may result in removal of the subscription created at the UDM node in response to the GET request at 731, but not a subscription created in response to the explicit subscription request as shown in FIG. 3.

Figure 7D:
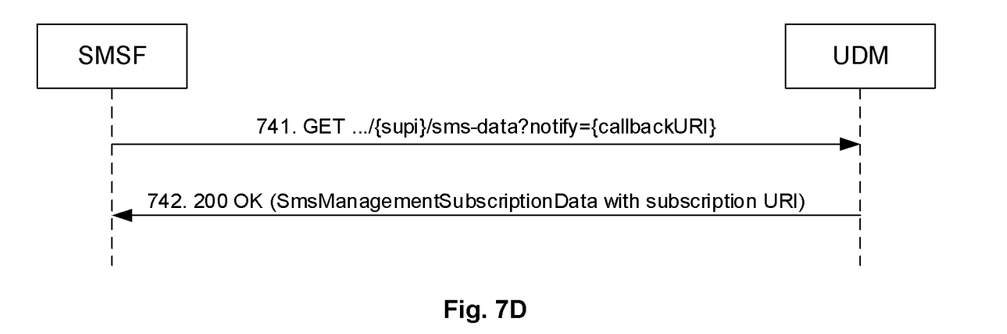

As shown in FIG. 7D, at 741, an SMSF node sends to the UDM node an HTTP GET request for retrieval of a UE's SMS management subscription data from the UDM node. The GET request can have a URI or URL such as:
http://{apiRoot}/nudm-sdm/v1/{supi}/sms-data?notify={callbackURI}.

Here, a query parameter "notify={callbackURI}" is included in the request and its presence indicates that the SMSF node is requesting for subscription to notification of changes in the SMS management subscription data. The key value of the parameter indicates a callback URI for use by the UDM node to notify such changes.

At 742, the UDM node responds with "200 OK", having a message body containing the requested SMS management subscription data along with a subscription URI for the subscription created at the UDM node. Then, the SMSF node can save the subscription URI, which can be used later for explicit unsubscription from the notification as described above in connection with FIG. 4.

As described above, a later HTTP GET request for retrieval of the SMS management subscription data without the query parameter may result in removal of the subscription created at the UDM node in response to the GET request at 741, but not a subscription created in response to the explicit subscription request as shown in FIG. 3.

It is to be noted that, in FIGS. 7A-7D, as an alternative to the HTTP GET method, an HTTP POST method can be used for each request for retrieval.

Figure 8A:
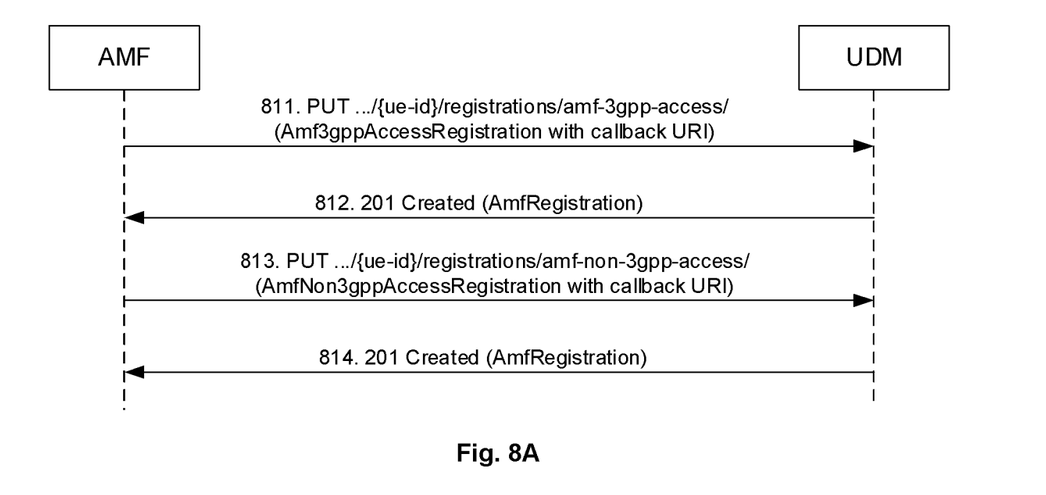
FIGS. 8A-8C are sequence diagrams each showing a notification subscription procedure according to another embodiment of the present disclosure.
Figure 8B:
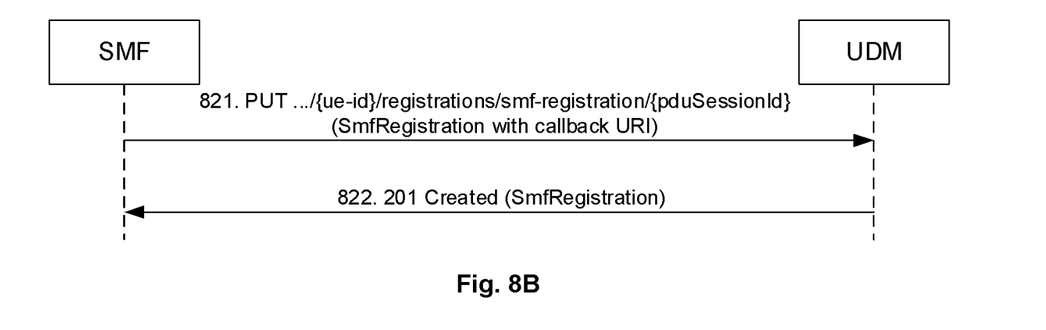
Figure 8C:
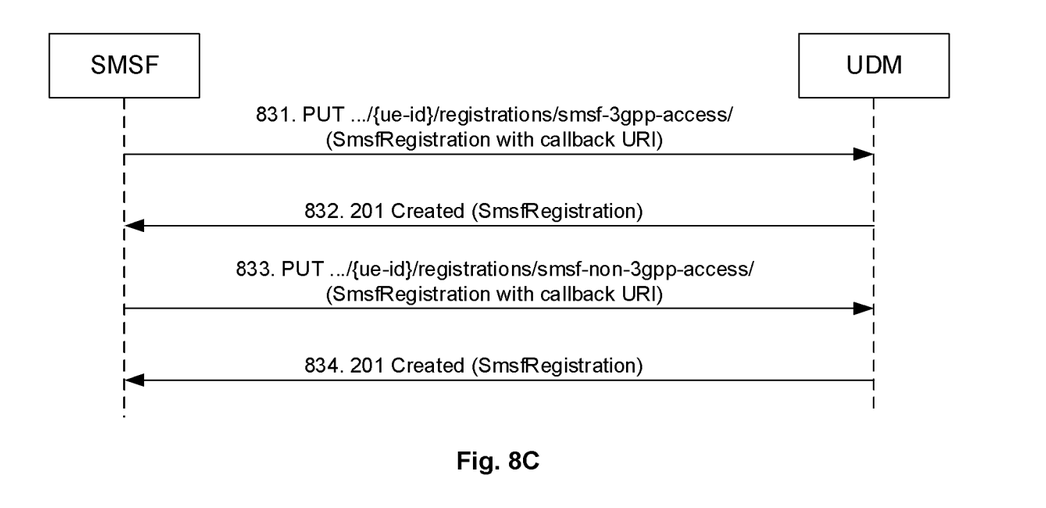

FIGS. 8A-8C are sequence diagrams each showing a notification subscription procedure using a request for registration according to an embodiment of the present disclosure.

In particular, as shown in FIG. 8A, at 811, an AMF node sends to the UDM node an HTTP PUT request for a UE's 3GPP access and mobility registration with the UDM node. The PUT request can have a URI or URL such as:
    http://{apiRoot}/nudm-sdm/v1/{ue-id}/registrations/
    amf-3gpp-access.

A request body can be included in the request and its presence indicates that the AMF node is requesting for subscription to notification of changes in data relevant to the AMF node, e.g., access and mobility subscription data, SMF selection subscription data and/or SMS subscription data. The request body carries a callback URI for use by the UDM node to notify such changes.

At 812, the UDM node responds with "201 Created", having a message body containing a 3GPP access and mobility registration result along with a subscription URI for the subscription created at the UDM node. Then, the AMF node can save the subscription URI, which can be used later for explicit unsubscription from the notification as described above in connection with FIG. 4.

Alternatively or additionally, at 813, the AMF node sends to the UDM node an HTTP PUT request for a UE's non-3GPP access and mobility registration with the UDM node. The PUT request can have a URI or URL such as:
    http://{apiRoot}/nudm-sdm/v1/{ue-id}/registrations/
    amf-non-3gpp-access.

A request body can be included in the request and its presence indicates that the AMF node is requesting for subscription to notification of changes in data relevant to the AMF node, e.g., access and mobility subscription data, SMF selection subscription data and/or SMS subscription data. The request body carries a callback URI for use by the UDM node to notify such changes.

At 814, the UDM node responds with "201 Created", having a message body containing a non-3GPP access and mobility registration result along with a subscription URI for the subscription created at the UDM node. Then, the AMF node can save the subscription URI, which can be used later for explicit unsubscription from the notification as described above in connection with FIG. 4.

As shown in FIG. 8B, at 821, an SMF node sends to the UDM node an HTTP PUT request for a UE's session management registration with the UDM node. The PUT request can have a URI or URL such as:
    http://{apiRoot}/nudm-sdm/v1/{ue-id}/registrations/smf-
    registrations/{pduSessionId}.

A request body can be included in the request and its presence indicates that the SMF node is requesting for subscription to notification of changes in data relevant to the SMF node, e.g., session management subscription data. The request body carries a callback URI for use by the UDM node to notify such changes.

At 822, the UDM node responds with "201 Created", having a message body containing a registration result along with a subscription URI for the subscription created at the UDM node. Then, the SMF node can save the subscription URI, which can be used later for explicit unsubscription from the notification as described above in connection with FIG. 4.

As shown in FIG. 8C, at 831, an SMSF node sends to the UDM node an HTTP PUT request for a UE's SMSF 3GPP access registration with the UDM node. The PUT request can have a URI or URL such as:
    http://{apiRoot}/nudm-sdm/v1/{ue-id}/registrations/
    smsf-3gpp-access.

A request body can be included in the request and its presence indicates that the SMSF node is requesting for subscription to notification of changes in data relevant to the SMSF node, e.g., SMS management subscription data. The request body carries a callback URI for use by the UDM node to notify such changes.

At 832, the UDM node responds with "201 Created", having a message body containing an SMSF 3GPP access registration result along with a subscription URI for the subscription created at the UDM node. Then, the SMSF node can save the subscription URI, which can be used later for explicit unsubscription from the notification as described above in connection with FIG. 4.

Alternatively or additionally, at 833, the SMSF node sends to the UDM node an HTTP PUT request for a UE's SMSF non-3GPP access registration with the UDM node. The PUT request can have a URI or URL such as:
    http://{apiRoot}/nudm-sdm/v1/{ue-id}/registrations/
    smsf-non-3gpp-access.

A request body can be included in the request and its presence indicates that the SMSF node is requesting for subscription to notification of changes in data relevant to the SMSF node, e.g., SMS management subscription data. The request body carries a callback URI for use by the UDM node to notify such changes.

At 834, the UDM node responds with "201 Created", having a message body containing an SMSF non-3GPP access registration result along with a subscription URI for the subscription created at the UDM node. Then, the SMSF node can save the subscription URI, which can be used later for explicit unsubscription from the notification as described above in connection with FIG. 4.

It is to be noted that, in FIGS. 8A-8C, as an alternative to the "201 Created" response, a "200 OK" or "204 No Content" response can be used.

Figure 9:
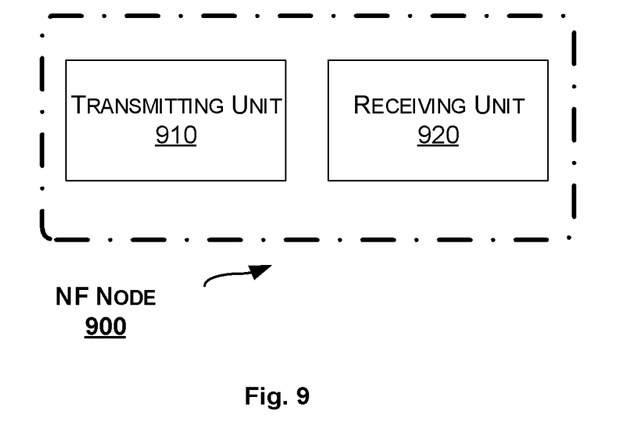
FIG. 9 is a block diagram of an NF node according to an embodiment of the present disclosure.

Correspondingly to the method 500 as described above, an NF node is provided. FIG. 9 is a block diagram of a NF node 900 according to an embodiment of the present disclosure. The NF node 900 can subscribe to notification of data change in a UDM node.

As shown in FIG. 9, the NF node 900 includes a transmitting unit 910 configured to transmit to the UDM node a request for retrieval of a user subscription data or a request for registration with the UDM node. The request for retrieval or the request for registration includes a callback URI for use by the UDM node to notify the NF node of the data change. The NF node 900 further includes a receiving unit 920 configured to receive from the UDM node a response to the request for retrieval or the request for registration.

In an embodiment, the request for retrieval can include a query parameter, as a request for subscription to notification of the data change associated with the user subscription data, and the callback URI can be indicated in a key value of the query parameter.

In an embodiment, the request for retrieval can be based on an HTTP GET or POST method.

In an embodiment, the request for registration can include a request body, as a request for subscription to notification of the data change relevant to the NF node, and the callback URI can be carried in the request body.

In an embodiment, the request for registration can be based on an HTTP PUT method.

In an embodiment, the response can include a subscription URI for a subscription created at the UDM.

In an embodiment, the transmitting unit 910 can further be configured to transmit to the UDM node a request for unsubscription from the notification using the subscription URI.

In an embodiment, the NF node can be an AMF node and the data change can include a change in access and mobility subscription data, SMF selection subscription data, or SMS subscription data. Alternatively, the NF node can be an SMF node and the data change can include a change in session management subscription data. Alternatively, the NF node can be a SMSF node and the data change can include a change in SMS management subscription data.

The transmitting unit 910 and the receiving unit 920 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 5.

Figure 10:
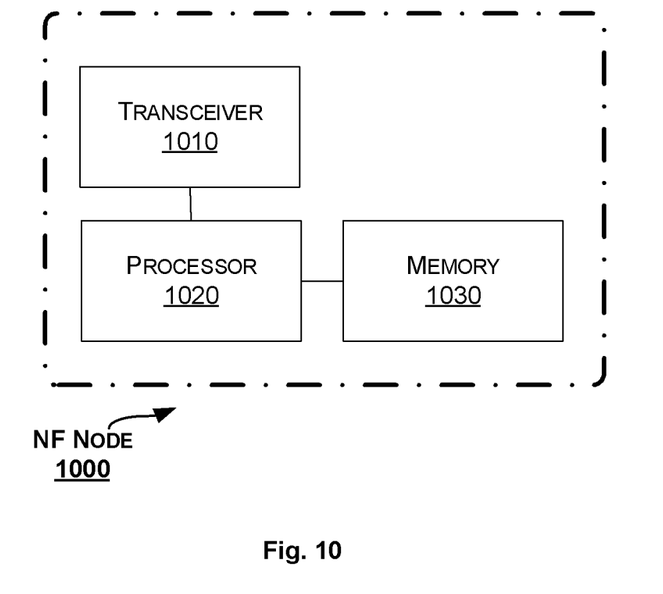
FIG. 10 is a block diagram of an NF node according to another embodiment of the present disclosure.

FIG. 10 is a block diagram of an NF node 1000 according to another embodiment of the present disclosure. The NF node 1000 can subscribe to notification of data change in a UDM node.

The NF node 1000 includes a transceiver 1010, a processor 1020 and a memory 1030. The memory 1030 contains instructions executable by the processor 1020 whereby the NF node 1000 is operative to perform the actions, e.g., of the procedure described earlier in conjunction with FIG. 5. Particularly, the memory 1030 contains instructions executable by the processor 1020 whereby the NF node 1000 is operative to: transmit to the UDM node a request for retrieval of a user subscription data or a request for registration with the UDM node, the request for retrieval or the request for registration including a callback URI for use by the UDM node to notify the NF node of the data change; and receive from the UDM node a response to the request for retrieval or the request for registration.

In an embodiment, the request for retrieval can include a query parameter, as a request for subscription to notification of the data change associated with the user subscription data, and the callback URI can be indicated in a key value of the query parameter.

In an embodiment, the request for retrieval can be based on an HTTP GET or POST method.

In an embodiment, the request for registration can include a request body, as a request for subscription to notification of the data change relevant to the NF node, and the callback URI can be carried in the request body.

In an embodiment, the request for registration can be based on an HTTP PUT method.

In an embodiment, the response can include a subscription URI for a subscription created at the UDM.

In an embodiment, the memory 1030 can further contain instructions executable by the processor 1020 whereby the NF node 1000 is operative to: transmit to the UDM node a request for unsubscription from the notification using the subscription URI.

In an embodiment, the NF node can be an AMF node and the data change can include a change in access and mobility subscription data, SMF selection subscription data, or SMS subscription data. Alternatively, the NF node can be an SMF node and the data change can include a change in session management subscription data. Alternatively, the NF node can be a SMSF node and the data change can include a change in SMS management subscription data.

Figure 11:
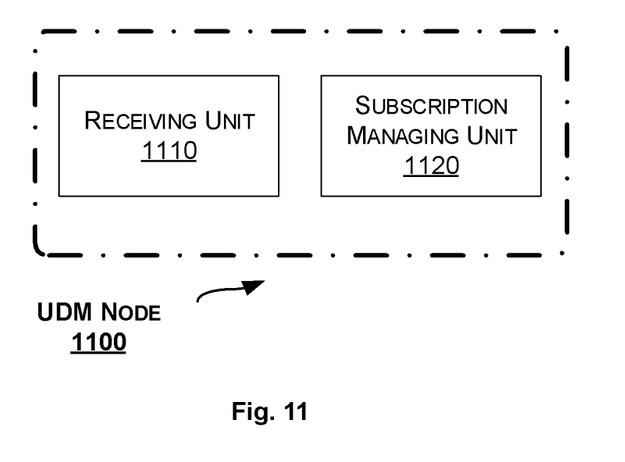
FIG. 11 is a block diagram of a UDM node according to an embodiment of the present disclosure.

Correspondingly to the method 600 as described above, a UDM node is provided. FIG. 11 is a block diagram of a UDM node 1100 according to an embodiment of the present disclosure. The UDM node 1100 can manage subscription of an NF node to notification of data change in the UDM node.

As shown in FIG. 11, the UDM node 1100 includes a receiving unit 1110 configured to receive from the NF node a request for retrieval of a user subscription data or a request for registration with the UDM node. The request for retrieval or the request for registration includes a callback URI for use by the UDM node to notify the NF node of the data change. The UDM node 1100 further includes a subscription managing unit 1120 configured to create a subscription to notification of the data change based on the callback URI.

In an embodiment, the request for retrieval can include a query parameter, as a request for subscription to notification of the data change associated with the user subscription data, and the callback URI can be indicated in a key value of the query parameter.

In an embodiment, the request for retrieval can be based on an HTTP GET or POST method.

In an embodiment, the request for registration can include a request body, as a request for subscription to notification of the data change relevant to the NF node, and the callback URI can be carried in the request body.

In an embodiment, the request for registration can be based on an HTTP PUT method.

In an embodiment, the UDM node 1100 can further include a transmitting unit configured to transmit to the NF node a response to the request for retrieval or the request for registration. The response can include a subscription URI for the created subscription.

In an embodiment, the receiving unit 1110 can further be configured to receive from the NF node a request for unsubscription from the notification using the subscription URI. The subscription managing unit 1120 can further be configured to remove the subscription in response to the request for unsubscription.

In an embodiment, the NF node can be an AMF node and the data change can include a change in access and mobility subscription data, SMF selection subscription data, or SMS subscription data. Alternatively, the NF node can be an SMF node and the data change can include a change in session management subscription data. Alternatively, the NF node can be a SMSF node and the data change can include a change in SMS management subscription data.

The receiving unit 1110 and the subscription managing unit 1120 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 6.

Figure 12:
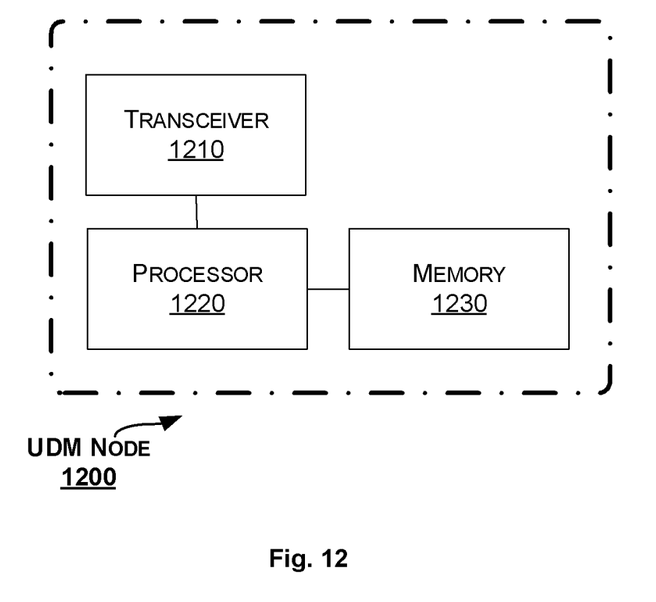
FIG. 12 is a block diagram of a UDM node according to another embodiment of the present disclosure.

FIG. 12 is a block diagram of a UDM node 1200 according to another embodiment of the present disclosure. The UDM node 1200 can manage subscription of an NF node to notification of data change in the UDM node.

The UDM node 1200 includes a transceiver 1210, a processor 1220 and a memory 1230. The memory 1230 contains instructions executable by the processor 1220 whereby the UDM node 1200 is operative to perform the actions, e.g., of the procedure described earlier in conjunction with FIG. 6. Particularly, the memory 1230 contains instructions executable by the processor 1220 whereby the UDM node 1200 is operative to: receive from the NF node a request for retrieval of a user subscription data or a request for registration with the UDM node, the request for retrieval or the request for registration including a callback URI for use by the UDM node to notify the NF node of the data change; and create a subscription to notification of the data change based on the callback URI.

In an embodiment, the request for retrieval can include a query parameter, as a request for subscription to notification of the data change associated with the user subscription data, and the callback URI can be indicated in a key value of the query parameter.

In an embodiment, the request for retrieval can be based on an HTTP GET or POST method.

In an embodiment, the request for registration can include a request body, as a request for subscription to notification of the data change relevant to the NF node, and the callback URI can be carried in the request body.

In an embodiment, the request for registration can be based on an HTTP PUT method.

In an embodiment, the memory 1230 can further contain instructions executable by the processor 1220 whereby the UDM node 1200 is operative to: transmit to the NF node a response to the request for retrieval or the request for registration. The response can include a subscription URI for the created subscription.

In an embodiment, the memory 1230 can further contain instructions executable by the processor 1220 whereby the UDM node 1200 is operative to: receive from the NF node a request for unsubscription from the notification using the subscription URI; and remove the subscription in response to the request for unsubscription.

In an embodiment, the NF node can be an AMF node and the data change can include a change in access and mobility subscription data, SMF selection subscription data, or SMS subscription data. Alternatively, the NF node can be an SMF node and the data change can include a change in session management subscription data. Alternatively, the NF node can be a SMSF node and the data change can include a change in SMS management subscription data.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 1020 causes the NF node 1000 to perform the actions, e.g., of the procedure described earlier in conjunction with FIG. 5; or code/computer readable instructions, which when executed by the processor 1220 causes the UDM node 1200 to perform the actions, e.g., of the procedure described earlier in conjunction with FIG. 6.

The computer program product may be configured as a computer program code structured in computer program modules. The computer program modules could essentially perform the actions of the flow illustrated in FIG. 5 or 6.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a Network Function (NF), node, the method comprising:
   transmitting, to a Unified Data Management (UDM) node, a first message that comprises both:
      an explicit request for retrieval of a user subscription data or an explicit request for registration with the UDM node; and
      an implicit request for subscription to notification of data change associated with the user subscription data, wherein subscription to notification of the data change is implicitly requested by inclusion in the first message of a callback Uniform Resource Identifier (URI), to which notification of the data change is to be sent; and
   receiving a second message from the UDM node, wherein the second message comprises a response to the explicit request for retrieval of the user subscription data or the explicit request for registration, and wherein the second message also comprises a subscription URI confirming that the NF node has subscribed to the notification of the data change associated with the user subscription data.

2. The method of claim 1, wherein the explicit request for retrieval comprises a query parameter, as the implicit request for subscription to notification of the data change associated with the user subscription data, and wherein the callback URI is indicated in a key value of the query parameter.

3. The method of claim 2, wherein the explicit request for retrieval is based on a Hyper Text Transfer Protocol (HTTP) GET or POST method.

4. The method of claim 1, wherein the explicit request for registration comprises a request body, as the implicit request for subscription to notification of the data change relevant to the NF node, and wherein the callback URI is carried in the request body.

5. The method of claim 4, wherein the explicit request for registration is based on a Hyper Text Transfer Protocol (HTTP) PUT method.

6. The method of claim 1, further comprising:
   transmitting to the UDM node a request for unsubscription from the notification using the subscription URI.

7. The method of claim 1, wherein:
   the NF node is an Access and Mobility Management Function (AMF) node and the data change comprises a change in access and mobility subscription data, Session Management Function (SMF) selection subscription data, or Short Message Service (SMS) subscription data, the NF node is an SMF node and the data change comprises a change in session management subscription data, or the NF node is an SMS Function (SMSF) node and the data change comprises a change in SMS management subscription data.

8. A Network Function (NF) node comprising:

a transceiver; and a processor and a memory, the memory comprising instructions executable by the processor whereby the NF node is operative to:

transmit, to a Unified Data Management (UDM) node, a first message that comprises both:

an explicit request for retrieval of a user subscription data or an explicit request for registration with the UDM node; and an implicit request for subscription to notification of data change associated with the user subscription data, wherein subscription to notification of the data change is implicitly requested by inclusion in the first message of a callback Uniform Resource Identifier (URI) to which notification of the data change is to be sent; and receive a second message from the UDM node, wherein the second message comprises a response to the explicit request for retrieval or the explicit request for registration, and wherein the second message also comprises a subscription URI confirming that the NF node has subscribed to the notification of the data change associated with the user subscription data.

9. A method in a Unified Data Management (UDM) node, the method comprising:

receiving, from a Network Function (NF) node, a first message that comprises both:

an explicit request for retrieval of a user subscription data or an explicit request for registration with the UDM node; and an implicit request for subscription to notification of data change associated with the user subscription data, wherein subscription to notification of the data change is implicitly requested by inclusion in the first message of a callback Uniform Resource Identifier (URI) for use by the UDM node to notify the NF node of the data change; and creating a subscription to notification of the data change based on the callback URI.

10. The method of claim 9, wherein the explicit request for retrieval comprises a query parameter, as the implicit request for subscription to notification of the data change associated with the user subscription data, and wherein the callback URI is indicated in a key value of the query parameter.

11. The method of claim 10, wherein the explicit request for retrieval is based on a Hyper Text Transfer Protocol (HTTP) GET or POST method.

12. The method of claim 9, wherein the explicit request for registration comprises a request body, as the implicit request for subscription to notification of the data change relevant to the NF node, and wherein the callback URI is carried in the request body.

13. The method of claim 12, wherein the explicit request for registration is based on a Hyper Text Transfer Protocol (HTTP) PUT method.

14. The method of claim 9, further comprising:

transmitting to the NF node a response to the explicit request for retrieval or the explicit request for registration, wherein the response includes a subscription URI for the created subscription, confirming that the NF node has subscribed to the notification of the data change associated with the user subscription data.

15. The method of claim 14, further comprising:

receiving from the NF node a request for unsubscription from the notification using the subscription URI; and removing the subscription in response to the request for unsubscription.

16. The method of claim 9, wherein:

the NF node is an Access and Mobility Management Function (AMF) node and the data change comprises a change in access and mobility subscription data, Session Management Function (SMF) selection subscription data or Short Message Service (SMS) subscription data, the NF node is an SMF node and the data change comprises a change in session management subscription data, or the NF node is an SMS Function (SMSF) node and the data change comprises a change in SMS management subscription data.

17. The method of claim 1, wherein the first message comprises the explicit request for retrieval of the user subscription data, wherein the first message includes the callback URI, and wherein the explicit request for retrieval of the user subscription data is a request for retrieval of Short Message Service (SMS) subscription data, a request for session management subscription data, a request for Session Management Function (SMF) selection subscription data, or a request for access and mobility subscription data.

18. The method of claim 1, further comprising receiving the user subscription data in response to the explicit request for retrieval of the user subscription data or receiving confirmation of registration with the UDM node in response to the explicit request for registration with the UDM node.

19. The method of claim 18, further comprising, after receiving the user subscription data or confirmation of registration with the UDM node, receiving notification of the data change based on the callback URI.

20. The method of claim 14, further comprising, after transmitting the response, using the callback URI to notify the NF node of the data change according to the created subscription.

* * * * *